March 8, 1949.  C. J. ROWE  2,463,564
FASTENER STUD RETAINING MEANS
Filed July 21, 1945
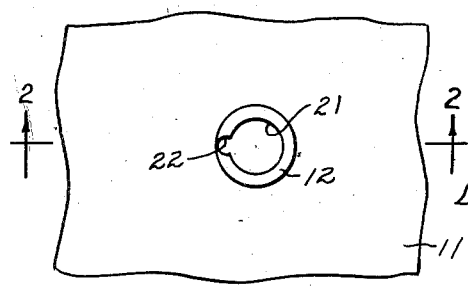
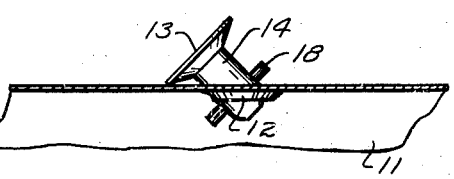
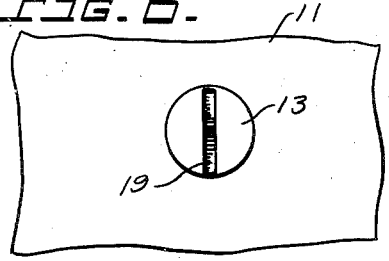
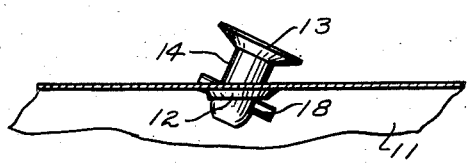
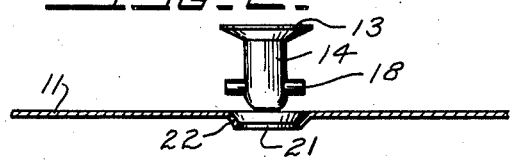
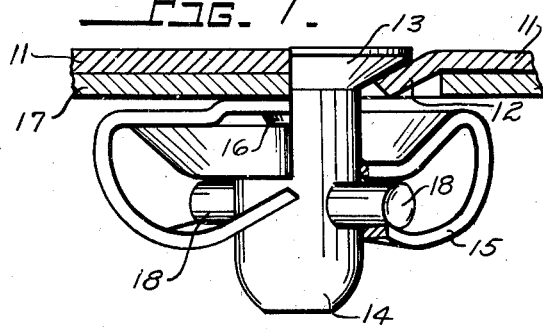
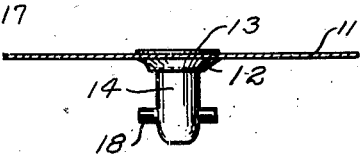
INVENTOR.
CLEMENT J. ROWE
BY Wade Koontz AND
Philip E. Liggen
ATTORNEYS Patented Mar. 8, 1949

2,463,564

UNITED STATES PATENT OFFICE 2,463,564

FASTENER STUD RETAINING MEANS

Clement J. Rowe, Dayton, Ohio

Application July 21, 1945, Serial No. 606,460

1 Claim. (Cl. 24—221)

(Granted under the act of March 3, 1883, as amended April 30, 1928; 370 O. G. 757)

The invention described herein may be manufactured and used by or for the Government for governmental purposes without payment to me of any royalty thereon.

This invention relates to stud and plate assemblies for cowl fasteners and to methods of assembling and disassembling the same. Cowl fasteners are of several different types, one of the most common consisting of a stud with a cross pin providing two lateral prongs, and a receptacle engaged by said prongs and locked to the stud by turning the latter through 90°.

When assembling cowl fasteners of the indicated type, it is usual to employ a stud-carrying plate or panel with a circular hole for each stud which is just large enough to admit the shank of the stud, and insert the stud in the hole and then press the cross pin into the stud from the other side of the panel by means of a special tool. The stud is then semi-permanently, though loosely, secured to the plate or panel, and is finally secured to the receptacle portion of the cowl fastener by turning it through 90°, thereby drawing together the members on which the cowl fastener parts are secured. If it becomes necessary to change or remove the studs, the cross pin must be forced out of each stud, which usually requires the entire cowling to be removed so that the operator can get at the cross pins.

Although military instructions prohibit the re-use of these cross pins, these instructions are not always complied with and the old cross pins or even nails are inserted in the studs, resulting in a loose assembly which due to the normal vibrations of the airplane frequently falls off the cowling, whereupon the cowling itself may be lost, and a dangerous condition may result.

A principal object of this invention is to provide a stud and cowling (or plate) assembly which will make it practically impossible to separate the studs from the plate which carries it until such separation is desired, yet will permit easy manual separation or disassembly, and also manual assembly, in any position of the cowling. In other words it is unnecessary, with the present invention, to remove the cowling. Thus the stud and cross pin can be assembled off the job, in fact at the factory where these parts are made, which will realize a considerable saving; or if desired, the stud shank and cross pin may be made integral, which may realize a still greater saving. Furthermore, dangerous conditions arising because of improper reuse of cross pins or substitutes therefor will be obviated. Other objects will appear from the following description of a preferred embodiment of the invention shown in the accompanying drawings forming a part of this specification.

In the drawings—

Fig. 1 is a fragmentary top plan view of a modified cowling or plate for carrying the stud;

Fig. 2 is a sectional view thereof taken on line 2—2 of Fig. 1, and an elevation of the stud which is to be assembled therewith;

Fig. 3 is a sectional elevation showing the stud of Fig. 2 tilted and partly inserted through the keyhole opening in the cowling or plate;

Fig. 4 is a similar view but showing the stud of Fig. 3 rotated through 180° and passed partly through the keyhole opening;

Fig. 5 is a similar view showing the stud all the way through the opening and ready to engage the stud receptacle;

Fig. 6 is a top plan view of the stud and plate in the assembled position of Fig. 5; and Fig. 7 is an enlarged sectional elevation of the stud locked to a stud receptacle, which is supported on a second plate.

Referring particularly to the drawings, the cowling 11, only a fragment of which is shown, is representative of any plate or panel which is desirably secured by a quick-attachable and detachable cowl fastener to another plate or panel or other support. Cowling 11 is formed with a plurality of dimples 12 (only one being shown) to receive the flush head 13 of a stud 14, which in this instance is shown as an "Airloc" stud, made by United-Carr Fastener, Cambridge, Massachusetts. An "Airloc" stud-receptacle 15 is fastened by rivets 16 to a plate or panel 17 to which the cowling 11 is to be secured. Of course other makes of cowl fasteners may be used. The stud-receptacle is not further described nor is it fully shown because its construction is well known, many millions being in use. Where a flush head stud is not desired, a round head stud (not shown) may be used, and in this event the cowling 11 will not have any dimples 12. Either type of stud has a cross pin 18 providing two lateral prongs which are spaced from the extremity of the shank of the stud, or as stated above, in lieu of a cross pin two prongs integral with the shank of the stud may be provided. A slot 19 in the head of the stud permits it to be turned manually by a coin or other instrument.

The cowling 11 is provided with a plurality of openings or slots each of which is shaped something like a keyhole, there being one opening or slot for each stud and stud-receptacle combination, but only one being shown in the drawings as they are all alike. Each keyhole slot consists of a round opening 21 and a notch 22 which is of small dimensions relative to opening 21 and projects radially outwardly. The notch 22 is only slightly wider than one of the prongs of the cross pin 18 and is much narrower than the extremity of the shank of the stud, so that said shank cannot pass through the notch. The length of notch 22, plus the diameter of opening 21, or in other words the overall length of the keyhole slot, is materially less than the overall length of cross pin 18, see Fig. 2. The result is that the stud cannot be inserted in the keyhole slot except by special manipulation, which will now be described.

When it is desired to assemble the stud and cowling or plate which is to carry the stud, the stud is turned until one prong is registered with notch 22, see Fig. 2. Then the stud is tilted or rocked through an angle to permit the prong to pass through notch 22, as shown in Fig. 3. With the parts as described, the extremity of the stud engages the edge of the round hole portion 21 of the keyhole slot, preventing separation of the partly assembled parts. After this it is necessary to rotate the stud a full 180° to bring the prong on the opposite side into registry with notch 22. By then rocking the stud toward the upright or normal position, it is now possible to pass the second prong through the notch. Finally, a slight rotation of the stud completes the assembly with plate or cowling 11. The stud may be locked now or later with the stud receptacle 15 on the other plate or panel 17, by merely turning it with a coin etc. through 90°.

When it is desired to disassemble the parts, assuming that the stud and its receptacle have been disengaged, the stud is rotated by hand to bring one prong into registry with notch 22, and the stud is then rocked or tilted and said prong is passeed through the notch to the top side of the plate or cowling. Next the stud is rotated through 180° to bring the second prong into registry with notch 22 and the stud is again rocked or tilted and lifted off the plate.

It should be particularly understood that while disassembly is very easy, it cannot occur accidentally except in extraordinarily rare instances, because the complete sequence of registry, rocking, outward movement, rotating through 180°, rocking and outward movement is indispensable for the separation of the parts; hence the studs and cowling, once assembled, will remain together until deliberately separated. This is an important advantage of the described construction and is not believed to be known in the art. The operations of assembly and disassembly are easily accomplished manually, i. e., without tools. A further advantage is of course the extreme simplicity and inexpensiveness of the improvement, no additional metal being required for it.

I am aware of the Forse Patent No. 885,033, dated April 21, 1908, and the Margerum et al. Patent No. 26,508, dated December 20, 1859, both showing keyhole-shaped slots for direct locking engagement with a complementarily shaped member. The principle of these and other prior art disclosures is different from the concept of this invention.

What I claim is:

In a fastening device containing a stud having a head and a shank and two prongs projecting laterally from the shank near the extermity of the shank and at diametrically opposite points, a thin plate or panel carrying the stud and having a round hole larger than the shank of the stud and a single notch extending radially outwardly from the periphery of said hole, said notch being much narrower than the width or diameter of the stud shank but large enough to permit one of the prongs to pass therethrough when the stud is properly tilted relative to the plate, said round hole and notch together forming an aperture the greatest dimension of which is less than the overall dimension of the shank plus the two prongs, the diameter of the stud shank having such a relationship to the diameter of the round hole that the stud can only be made to enter said aperture by being tilted to pass one prong through the notch and then rotated 180° on its axis relative to the plate to bring the other prong into registry with the notch and then inserting said other prong by straightening the stud, and said stud can only be removed from the plate by first tilting to bring one prong out of the notch and then axially rotating 180° to cause the other prong to register with the notch.

CLEMENT J. ROWE.

REFERENCES CITED

The following references are of record in the file of this patent:

UNITED STATES PATENTS

| Number | Name | Date |
|---|---|---|
| 1,948,462 | Le Page | Feb. 20, 1934 |
| 2,378,122 | Barlow | June 12, 1945 |
| 2,391,288 | Barlow | Dec. 18, 1945 |